M. L. HINMAN.
Tank for Transporting Gas, Oil, &c.
No. 211,735. Patented Jan. 28, 1879.
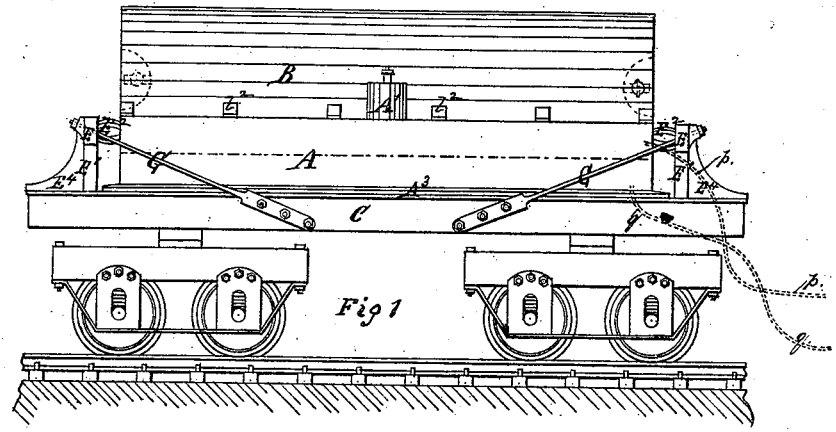
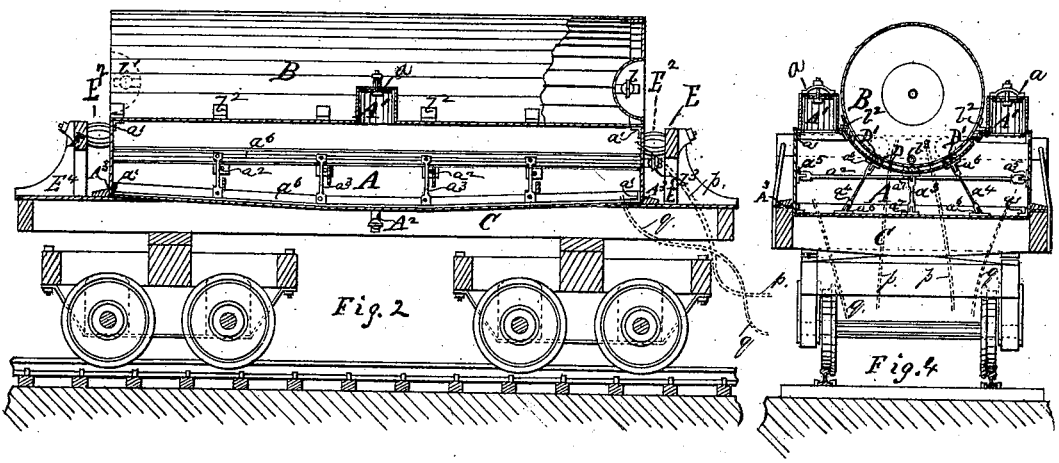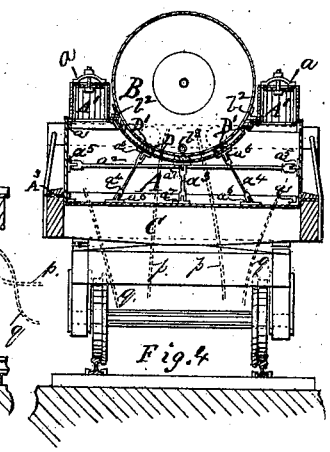
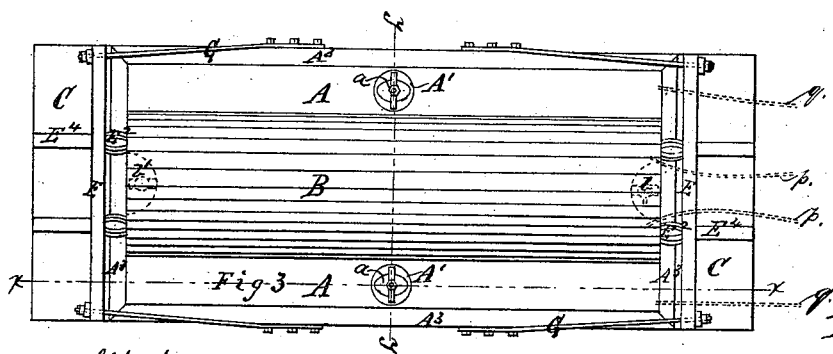
Attest:
Walter Allen
Geo. P. Smallwood Jr.
Inventor:
Marshall L. Hinman
By Knight Bros
attys

UNITED STATES PATENT OFFICE.

MARSHALL L. HINMAN, OF DUNKIRK, NEW YORK.

IMPROVEMENT IN TANKS FOR TRANSPORTING GAS, OIL, &C.

Specification forming part of Letters Patent No. 211,735, dated January 28, 1879; application filed December 11, 1878.

*To all whom it may concern:*

Be it known that I, MARSHALL L. HINMAN, of Dunkirk, in the county of Chautauqua and State of New York, have invented a new and useful Combination of Tanks for the Transportation of Gas and Oil or other Liquid, of which invention the following is a specification:

This invention has for its object the construction and combination of tanks or holders, to be used together, for the transportation of gas and oil or other liquid, a separate tank or compartment being provided for the gas, and likewise a separate tank or compartment for the liquid.

It being a well-known fact that the localities that produce petroleum also abound in natural gas-wells, both of these products could be readily transported together if suitable tanks were provided for the purpose, and the oil, being compact and heavy, may easily be carried in a lower compartment, tank, or reservoir, while a tank, reservoir, or compartment superimposed on the oil tank or compartment may be filled with natural or manufactured gas under pressure and carried along with the oil without adding anything to the real cost of transportation, except for the slightly-added weight of the gas tank or compartment.

This combination of tanks or compartments may also be used with locomotive-engines, where the gas may be used for fuel, water being carried in the lower tank or compartment.

This invention will be readily understood by reference to the accompanying drawings, of which Figure 1 is a side elevation of the combined tanks. Fig. 2 is a longitudinal sectional elevation of the same. Fig. 3 is a general plan thereof. Fig. 4 is a transverse sectional elevation thereof.

A represents the lower tank or reservoir for oil or other liquid, and B the upper tank or receiver for compressed gas. The tank or reservoir A will preferably be rectangular in form, and in width a little less than the width of the car-platform C, on which it is to be placed, and in length a little shorter than the car-platform.

A concave seat extending the entire length of the tank A will be made to receive the lower side of tank B, which, being cylindrical in form, will rest therein. At each side of the tank B, and in the top of the tank A, which will be wider than the tank B, there will be a small dome, $A^1$, with a man-hole plate, $a$, in it. The bottom part of the tank A will be somewhat deeper in the center, just below the dome $A^1$, and sloping thence up toward each end, as shown in Fig. 2, so that in unloading or discharging the oil or liquid it can nearly all be removed from this central basin or discharged through the outlet cock and pipe $A^2$.

The tank A may be made with suitable angle-irons $a^1$ in the angles of it, to which irons the side, top, bottom, and end plates must be thoroughly riveted; or the tank A can be made with flanged angles or corners.

Transverse, vertical, and diagonal stay-rods $a^2$, $a^3$, and $a^4$ will respectively be secured to angle or T irons $a^5$, $a^6$, and $a^7$, riveted to the plates of the tank. An angle-iron plate, $A^3$—or, in lieu of this, a beveled strip of wood—will be placed alongside of the tank A, and securely fastened to the top of the car-floor, so as to hold the tanks in position upon the car.

The tank B will be provided with a suitable cock or valve, $b$, for receiving and discharging the gas, and also with a safety-valve or blow-off cock, $b^1$, for the escape of the gas when the pressure in the tank B exceeds the desired limit. L-shaped angle-irons $b^2$ will be riveted to the sides of the tank B, as shown in Figs. 1 and 4, so as to assist in seating it on the tank A. There will also be a suitable cock, $b^3$, at or near the bottom of the tank B, for the purpose of allowing the air filling the tank to escape when it is required to be filled with gas, and also for the purpose of discharging any liquid matter that may accumulate in the said tank or holder.

To adapt the combination of tanks for use as a tender to a locomotive-engine, pipes, tubes, or hose to conduct the gas from the tank B to the fire-box of the locomotive will be used, as indicated in dotted lines at $p$ $p$, suitable flexible connections, valves, and cocks being provided.

$q$ $q$ represent the customary flexible pipes, tubes, or hose for conducting water from the tanks A to the boiler-feeder.

The tanks A and B will not be allowed to touch each other; but a small space or chamber, D, concentric with the tank B, will be allowed between them, as shown in Fig. 4, and in this chamber there will be placed a cushion, D', which will afford an easy and perfectly-fitting seat for the tank B. This cushion may be formed of strips of wood, placed either longitudinally or transversely, and strips of india-rubber, felt, or other suitable cushioning may be affixed to the strips. This cushion might, however, be formed of some substance which could be put in a plastic state, and then harden to solidity or partial solidity, and then a sheet or sheets of felt or other substance laid on top of it.

At each end of the tanks or holders A and B there will be placed a transverse beam, E, supported by braces or posts $E^1$ on the top of the car-platform, and cushions $E^2$, of india-rubber or other suitable material, will be interposed between these beams and the tank B, for the purpose of holding the tank B easily, yet securely, in place on the tank A, so as to resist inertia shocks at the time of starting and stopping. Strong iron strap-rods G will be securely fastened to the side sills of the car, and held to the beams E by suitable nuts and washers.

Brace-pieces $E^4$ may be interposed between the beams E and the floor of the car, so as to transmit the inertia shocks directly to the car-frame.

Having described my invention, the following is what I claim as new and desire to secure by Letters Patent:

1. The combination of a liquid tank or reservoir, A, formed with a recess, D, in its upper surface, and a gas tank or receiver, B, resting in said recess, substantially as and for the purpose set forth.

2. The combination of the recessed liquid-tank A, the gas-tank B, resting in the recess thereof, and the interposed cushion D, substantially as and for the purposes set forth.

MARSHALL L. HINMAN.

Witnesses:
  CHARLES E. HENQUENBOURG,
  OCTAVIUS KNIGHT.